May 20, 1952 J. D. REID 2,597,596
INSULATOR BUSHING SEAL
Filed Nov. 30, 1944
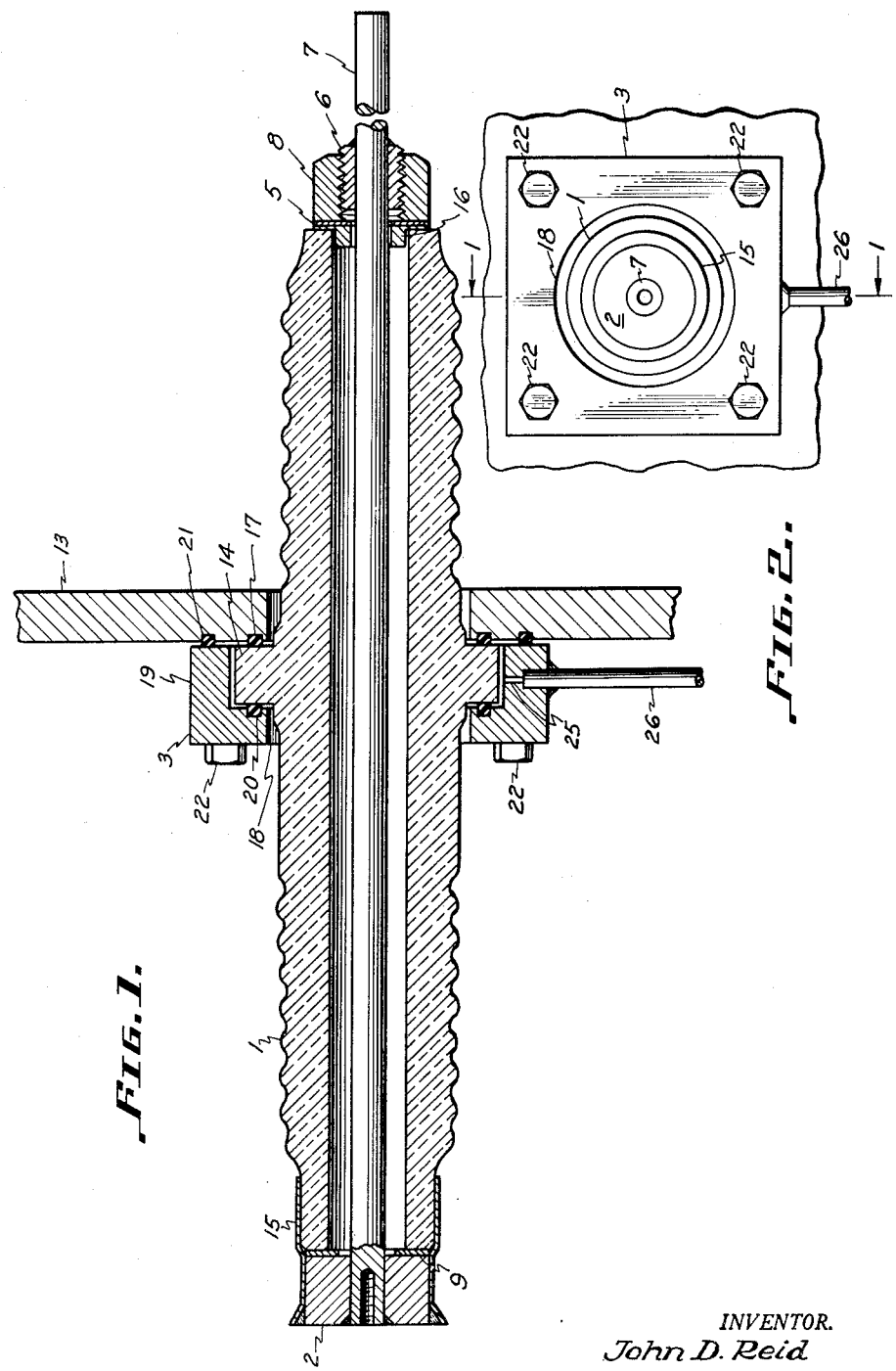
INVENTOR.
John D. Reid
BY
Robert A. Lavender
ATTORNEY Patented May 20, 1952

2,597,596

UNITED STATES PATENT OFFICE 2,597,596

INSULATOR BUSHING SEAL

John D. Reid, Oak Ridge, Tenn., assignor, by mesne assignments, to the United States of America as represented by the United States Atomic Energy Commission Application November 30, 1944, Serial No. 566,010

4 Claims. (Cl. 174—18)

This invention is concerned with sealing arrangements and is particularly concerned with a mechanical seal whereby appurtenances may pass through a side wall of an evacuated chamber with the sealing arrangement of the invention providing an effective seal to prevent the leakage of pressure through the opening in the side wall of the chamber.

An object of my invention is to provide a mechanical seal for sealing a stem or the like passing through the side wall of an evacuated chamber which can be readily assembled and disassembled without detracting from its effectiveness.

A further object of the invention is to provide a mechanical seal of the type referred to which provides a pumpout space within the seal itself so that the effectiveness of the seal is assured without dependency being had on other apparatus or attachments.

Further objects and numerous advantages of my invention will become apparent from the following detailed disclosure and annexed drawing wherein Fig. 1 is a cross sectional view of my invention, this view being taken along the line 1—1 of Fig. 2.

Fig. 2 is an exterior end view of the arrangement of my invention as shown in cross section in Fig. 1.

Referring to Fig. 1 of the drawings, the mechanical seal of my invention is shown in cross section and it is shown used in connection with a ceramic insulator bushing 1 which extends through an opening as shown in the side wall of a chamber 13 which is evacuated by any suitable means not shown and which may include diffusion pumps in combination with mechanical pumps. In this particular instance the insulator bushing 1 serves as an insulator for an electrical conductor 7 which extends into the interior of the chamber or container 13 for carrying current to the interior of the container. The member 7 itself may be considered an electrode. The electrode 7 passes longitudinally through bushing 1 as shown and is fastened by soldering to a cap 2 which closes the left end of the bushing 1. The cap member 2 is attached to the end of the bushing 1 by spring brackets 15 which are soldered to the cap 2 and the cap member 2 is spaced from the end of the bushing 1 by a washer 9.

At the right end of the bushing 1 is a hexagonal nut 8 which engages a threaded sleeve 6 through which the electrode 7 passes, the sleeve 6 being soldered to the electrode 7. The nut 8 bears against a spacer washer 5 and a collar 16 which are interposed between the nut 8 and the end of the bushing 1. It is to be seen therefore that the parts as so far described are held in assembled relationship by the nut 8 and the spring brackets 15.

At about the center of the bushing 1 there is an annular shoulder or flange 14 which is adjacent the exterior surface of the side wall of the container 13. The shoulder 14 bears against a gasket ring 17 which seats in an annular groove surrounding the opening in the side wall of the container 13. Numeral 3 designates a gland member which has an opening 18 therethrough so that the member 3 fits over the bushing 1. The member 3 is cylindrically recessed forming a skirt like portion 19 which fits around the flange 14 when the parts are in assembled relationship, the skirt like portion 19 having larger internal diameter than the diameter of the flange 14. Numeral 20 designates a packing ring which fits into an annular groove cut in the inner face of member 3 adjacent the opening 18 so that the packing ring can bear against the left face of flange 14. The face of the skirt portion 19 of member 3 bears against another packing ring 21 which fits in an annular groove cut in the side wall of the container 13. The parts are held in assembled relationship by screws 22 which extend through the corners of the member 3 (see Fig. 2) and engage in the side wall of the container 13 so that when they are turned down the member 3 is urged against the packing rings 20 and 21 and these packing rings are in turn urged against the flange 14 and the side wall of container 13 respectively, and the flange 14 is urged against the packing ring 17 and the side wall of the container 13.

From the foregoing it is to be seen that member 3 forms a space between itself and the flange 14 which is sealed all around by the various packing rings. This space forms a pumpout and it is provided with an opening 25 to which is connected a tube or pipe 26 whereby the pumpout space may be separately evacuated.

From the foregoing it can be seen that leakage into the interior of the container 13 is prevented not only by the packing ring 17 but also by the packing rings 20 and 21. Any leakage past packing ring 17 is only from within the pumpout space which is continually evacuated through the pipe 26 so that any leakage into the container 13 would be minimized. Any leakage from outside the tank 13 past the packing rings 20 and 21 is only into the pumpout space so that opportunity is provided to evacuate this leakage through the pipe 26 before it has an opportunity to leak past the packing ring 17 into the interior of container 13.

In disassembling the apparatus described, the bolts 22 are simply removed and the parts taken apart with the packing rings remaining in their respective grooves. In reassembling, the bushing 1 is simply placed in the opening in the side wall of container 13 and member 3 is slipped over the bushing 1 and bolted into place. Frequent disassembly and reassembly does not mitigate against the effectiveness of the seal since it is entirely mechanical, there being no sliding parts or friction members.

From the foregoing, those skilled in the art will observe that my invention provides an effective mechanical seal which provides a pumpout within itself and provides for assembly and disassembly without detracting from the effectiveness of the seal.

The embodiment of my invention disclosed herein is illustrative of its preferred form and it is thus desired that the disclosure be interpreted in an illustrative rather than a limited sense and that the boundaries of the invention be commensurate with the scope of the claims appended hereto:

I claim:

1. Apparatus of the character described comprising in combination, means forming a vacuum tight container having an opening in a side wall thereof, an element in said opening, said element having a flange and means whereby said flange engages said containers in sealing relationship, and means engaging both said flange and said container in sealing relationship so as to form a space between said last means and said flange which is entirely sealed, and means providing an opening into said space whereby it may be evacuated forming a pumpout.

2. Apparatus of the character described comprising in combination, means forming a vacuum tight container having an opening in a side wall thereof, an element extending through said opening having an annular shoulder adjacent said opening and means whereby said shoulder engages said container in sealing relationship, a member having an opening in it and surrounding said element, and means whereby said member engages both said shoulder and said container in sealing relationship so as to form a space between the member and the shoulder which is entirely sealed, and means providing an opening into said space whereby it may be evacuated forming a pumpout.

3. Apparatus of the character described comprising in combination, means forming an evacuated chamber having an opening in the side wall thereof, an element extending through said opening having a shoulder adjacent said opening, and means whereby said shoulder sealingly engages said container, a member having a circular opening surrounding said element and means whereby said member engages both said shoulder and said container in sealing relationship so as to form a space between said member and said shoulder which is sealed all around, attaching means urging said member and said shoulder against the side wall of said container to hold the parts in assembled relationship, and means providing and opening into said space whereby the space may be evacuated forming a pumpout.

4. Apparatus of the character described comprising in combination, means forming an evacuated chamber having an opening in the side wall thereof, means forming an insulator bushing extending through said opening and having an annular shoulder adjacent the opening and means whereby the shoulder sealingly engages the container, said sealing means including an annular seal interposed between the shoulder and the side wall, means forming a ring-like member surrounding said insulator bushing, said ring-like member having a skirt portion extending across the shoulder, an annular seal interposed between the skirt and said side wall, and sealing means interposed between the ring-like member and the shoulder whereby to form a space between the skirt portion and the annular shoulder which is sealed all around, and means for urging the ring-like member and the annular shoulder towards the container to hold the parts in assembled relationship, and means providing an opening into said space whereby it may be evacuated to form a pumpout.

JOHN D. REID.

REFERENCES CITED

The following references are of record in the file of this patent:

UNITED STATES PATENTS

| Number | Name | Date |
|---|---|---|
| 615,896 | Poche | Dec. 13, 1898 |
| 1,572,404 | Mershon | Feb. 9, 1926 |
| 1,643,216 | Kramer | Sept. 20, 1927 |
| 1,953,033 | Widmer | Mar. 27, 1934 |
| 1,957,481 | Willoughby | May 8, 1934 |
| 2,151,937 | Rabuteau et al. | Mar. 28, 1939 |
| 2,264,816 | Treanor | Dec. 2, 1941 |